United States Patent [19]

Morganti et al.

[11] Patent Number: 4,833,603
[45] Date of Patent: May 23, 1989

[54] APPARATUS AND METHOD FOR IMPLEMENTATION OF A PAGE FRAME REPLACEMENT ALGORITHM IN A DATA PROCESSING SYSTEM HAVING VIRTUAL MEMORY ADDRESSING

[75] Inventors: Victor M. Morganti, Lincoln; James B. Geyer, Natick, both of Mass.

[73] Assignee: Bull HN Information Systems Inc., Billerica, Mass.

[21] Appl. No.: 869,146

[22] Filed: May 30, 1966

[51] Int. Cl.⁴ .............................................. G06F 12/08
[52] U.S. Cl. ..................................................... 364/200
[58] Field of Search ... 364/200 MS File, 900 MS File

[56] References Cited

U.S. PATENT DOCUMENTS

| | | | |
|---|---|---|---|
| 4,084,230 | 4/1978 | Matick | 364/200 |
| 4,121,286 | 10/1978 | Venton et al. | 364/200 |
| 4,638,426 | 1/1987 | Chang et al. | 364/200 |

*Primary Examiner*—Raulfe B. Zache
*Assistant Examiner*—Florin Munteanu
*Attorney, Agent, or Firm*—William W. Holloway; Faith F. Driscoll; John S. Solakian

[57] ABSTRACT

In a multiprocessor, multiprogrammed data processing system employing virtual addressing, apparatus and method are provided for selecting a page frame in a main memory unit to be replaced by a new page frame of logic signal groups required by a processor. Rather than utilize an algorithm implemented in a series of logical decisions determined by a software procedure, the present invention provides for a single instruction that uses the status signals included with a page descriptor to address an entry in a table of resulting status signals. The relationship between the status signals and the table entries implements the algorithm. The table with entries of resulting status signals is associated with the instruction and is stored in the processor when the instruction is prepared for execution by the processor. The resulting status signals are stored with the page descriptor, replacing the original status signals. The resulting status signals are analyzed by a software procedure, the software procedure implementing the page replacement activity and executing other activity indicated by the resulting status signals.

19 Claims, 3 Drawing Sheets

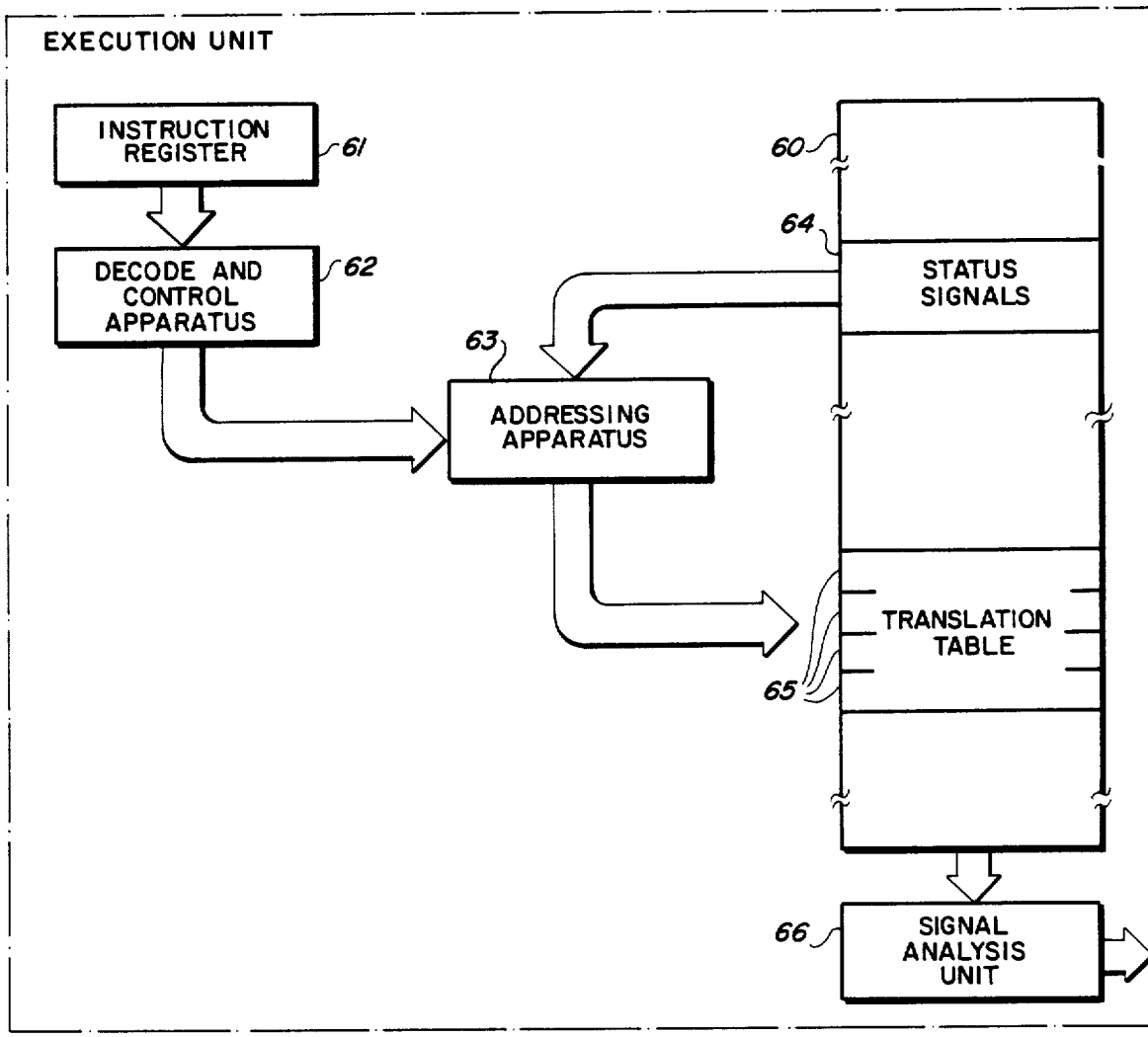
FIG. 5A — TRANSLATION TABLE ENTRIES
FIG. 5B
FIG. 6
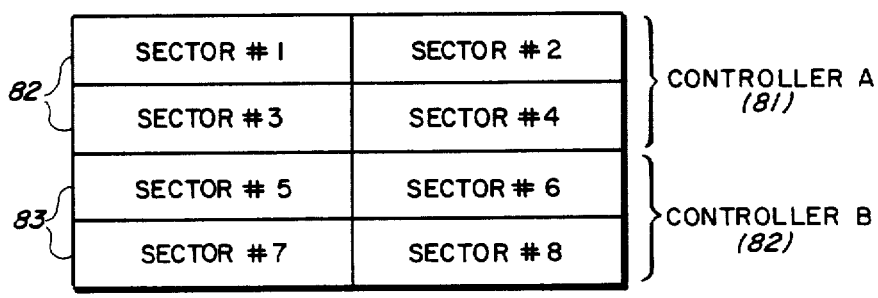
FIG. 8

APPARATUS AND METHOD FOR IMPLEMENTATION OF A PAGE FRAME REPLACEMENT ALGORITHM IN A DATA PROCESSING SYSTEM HAVING VIRTUAL MEMORY ADDRESSING

BACKGROUND OF THE INVENTION

1. Field of the Invention

This invention relates generally to data processing systems and, more particularly, to data processing systems that have a plurality of central processing units using the techniques of virtual addressing to interact with a main memory unit.

2. Discussion of the Related Art

In the modern data processing system, a hierarchical memory system is typically used. The bulk of the data capable of being accessed by a data processing system is stored on mass storage media such as magnetic tape, magnetic disks or other media capable of storing large amounts of digital information. These media are typically too slow to permit the direct addressing of the stored data by a central processing unit. A memory unit, generally referred to as the main memory unit, is implemented with a faster technology and stores portions of the data required by the data processing system. (Although not directly related to the present invention, a memory of yet faster technology utilized for storing data of immediate importance to the central processing unit and physically located within the central processing unit is generally included in the data processing system. The memory apparatus in the central processing unit is referred to as the buffer or cache memory.)

Each central processing unit or processor, by means of the operating system, has access to all of the available data associated with the data processing system and can utilize this data as required. As a practical matter, because of the size of data available to the processor, the retrieval of the required data from the mass storage devices would have a detrimental impact on the performance of the process execution. The data having an immediate requirement by the data processing system is stored in the main memory unit. Because storing all of the data in the main memory is impractical, the data is divided into data blocks, called pages, that are entered into the main memory unit as separate entities.

In the virtual memory techniques, at the start of operation of the data processing unit, the operating system allocates the space available in the main memory unit. Main memory unit space will be allocated to programs, tables, and portions of the operating system required for the operation of the data processing system. This space in the main memory unit does not have the contents replaced as is typical of the remainder of the data stored in the main memory unit. The remainder of the main memory unit is divided in equal blocks where groups of related data signals that are important to the data processing system can be stored. These data signal blocks are referred to as page frames. Associated with each page frame is a group of data signals in a table of related signals referred to as the page frame descriptor. The operating system can reference the page frame descriptor and the page frame descriptor identifies or points to the location of the associated page descriptor. The page description includes information relating the virtual or symbolic address manipulated by the processors of a data processing system to the actual or physical address where the original information is stored. Also associated with each page descriptor are signals relating to status information. The page frame descriptor also includes data signals in a location referred to as a linker, the linker being indicative of the order of the page frames according to a preselected algorithm defining how order of the page frames is to be defined.

After initialization of the data processing system, a processor will require a group of data signals. A software procedure will provide the information relating the physical address to the symbolic address for the required group of data signals. The information relating these quantities is stored in the page descriptor. The appropriate information is entered in the linker portion of the page frame descriptor indicating that this is the first of the sequence of page frames. As additional page frames are added, the linker information will identify the order of the page frames in the sequence. After the page frames are all occupied with data, a processor will continue to require access to new data, requiring that a page frame already containing data will have new data replace the old data. It is implementation of this page frame data replacement to which the present invention is related.

From the linker information, the next possible page frame in the sequence of page frames can be determined. Based on the linker information, the page description associated with that page frame can be identified and the page descriptor can be entered in the processor. The processor, under software control in the prior art, examines the values of the status signals in the page descriptor and, based on the values of these status signals, a decision is made as to the whether data in that page frame can be replaced. For example, a status signal that is frequently used relates to the experience that the optimum strategy for the replacement of data is to replace the least most recently used data. To implement the least most recently used strategy requires an unacceptable amount of processing overhead. A typical strategy is to remove the "data used" signal according to a predetermined procedure, and to set the "data used" in the page descriptor whenever the data associated with a page frame is used. In this manner, the software procedures can determine that the data has been used within a preselected period of time.

In addition, still other status signals can be associated with the page frame. Because of the multiplicity of status signals, a software procedure providing a decision with respect to the replacement of the associated group of data can be complex and require an unacceptable amount of processing activity.

When the program controlling the operation of the data processing system requires data signal groups not currently stored in the main memory unit, the replacement algorithm is invoked. In the prior art, the replacement algorithm was executed by a software process, requiring an analysis of the several status signals. During the determination of the page frame data to be replaced, access to the descriptor was prevented to prevent the use of data that could be in the process of change. One technique to prevent access during this period of possible data change was to provide the portions of the main memory unit space with a memory "lock", the memory lock preventing access to the main memory unit or the selected portions thereof. This technique was effective in insuring that proper data was used by the processors, but, because of the relative slow execution of the software replacement algorithm, the performance of the entire data processing system could be severely impacted. As will be clear to those skilled in the art, for practical reasons, the memory lock typically involves a plurality of memory location groups or pages. The performance of the data processing system will therefore be impacted even if the particular location being analyzed by the replacement algorithm is not accessed.

In order to eliminate the reservation of a main memory portion during execution of the replacement algorithm, techniques have been used that permit the execution of the replacement without reservation of the main memory unit portion. According to this technique, a determination is made, after a replacement page frame selection has been performed for a particular location, if a change has occurred in the status signals of the page frame header during the execution of the replacement algorithm. This technique has required additional complexity in the data processing system.

A need has therefore been felt for a technique that permits the determination of a main memory unit location suitable for having the present data stored therein replaced by new data required by the data processing system.

OBJECTS OF THE INVENTION

It is an object of the present invention to provide an improved data processing system.

It is a feature of the present invention to provide for a replacement of a group of data in the main memory of a data processing system according to preselected criteria based on status signals associated with the group of data.

It is another feature of the present invention to provide for an analysis of a group of status signals without using a software procedure for the analysis.

SUMMARY OF THE INVENTION

The aforementioned and other objects are accomplished, according to the present invention, by providing the data processing system with an instruction that generates new status signals based on the original status signals while minimizing the impact on the availability of the main memory unit. During a page frame replacement procedure, the page descriptor associated with the next page frame to be examined for suitability for replacement is transferred to the processor. Associated with the instruction executing the replacement determination algorithm is a table of resulting status signals. The status signals of the page descriptor are used to select an appropriate entry in the instruction table. The selected resulting status signals indicate whether the associated page frame data should be replaced, and the selected status signals can be used to indicate other activity required by the processor. The selected status signals are stored in the descriptor which is stored in the main memory unit. These and other features of the present invention will be understood upon reading of the following description along with the figures.

BRIEF DESCRIPTION OF THE DRAWINGS

FIG. 5A illustrates the entries in the translation table, while FIG. 5B provides examples of the use of the translation table.

FIG. 6 is a block diagram of the apparatus in the execution unit that executes the replacement instruction.

FIG. 8 illustrates the separation of the main memory unit into sectors for purposes of limiting access.

DESCRIPTION OF THE PREFERRED EMBOIDMENT

1. Detailed Description of the Figures

Figure 1:
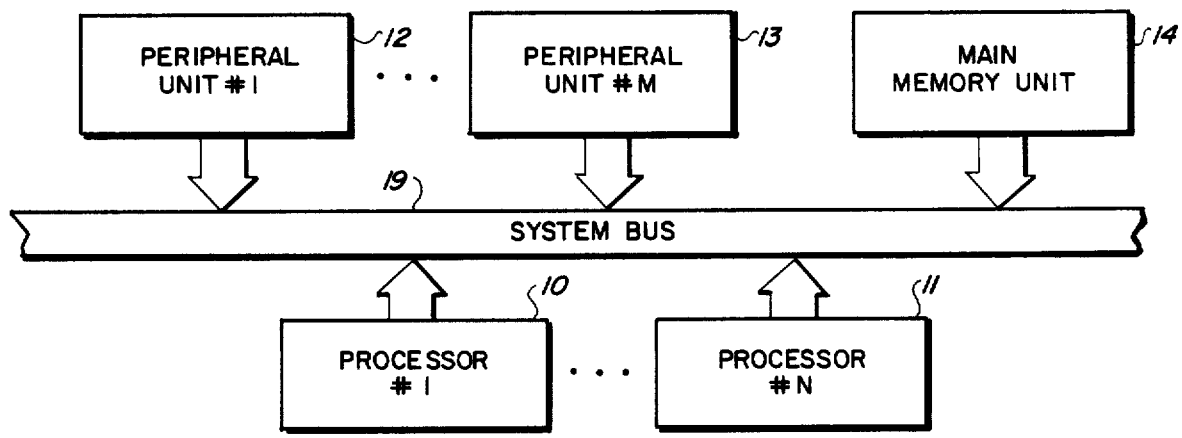
FIG. 1 is a block diagram of a data processing system capable of using the present invention.

Referring not to FIG. 1, a data processing system capable of advantageously utilizing the present invention is shown. The data processing system includes at least one processor (illustrated by processor 10 and processor 11), a main memory unit 15, at least one peripheral interface unit (illustrated by peripheral interface unit 12 and peripheral interface unit 13) and a system bus 19. In the data processing system illustrated in FIG. 1, the main memory unit stores the data signal groups to be manipulated by the processors. In the main memory unit 15 during initialization of the system, the storage space of the main memory unit is divided into a multiplicity of regions, each region for storing a preestablished quantity of logic signals. In addition, the main memory unit has certain regions reserved for files, the files being accessible to the processors. The use of a common main memory unit for a plurality of processors is described as a "tightly coupled" system.

Figure 2:
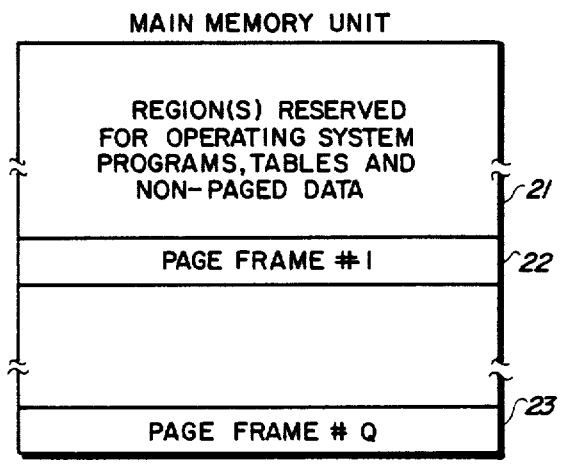
FIG. 2 is a diagram illustrating the division of the main memory unit into a plurality of memory location groups.

Referring now to FIG. 2, a diagrammatic representation of the organization of the main memory is shown. This organization is typically established during initialization of the data processing system. Region 21 is generally reserved for operating system, programs and tables required by the data processing system. The remainder of the main memory unit locations are divided into groups of main memory unit locations referred to as page frames. FIG. 2 illustrates page frame #1 22 through page frame #Q23. It will be clear that FIG. 2 is an idealized representation of the organization of the main memory unit locations. Typically, region 21 would be fragmented and dispersed throughout the main memory unit. The numbering of the page frames is arbitrary and designates, at best, only a physical location in the main memory unit.

Figure 3A:
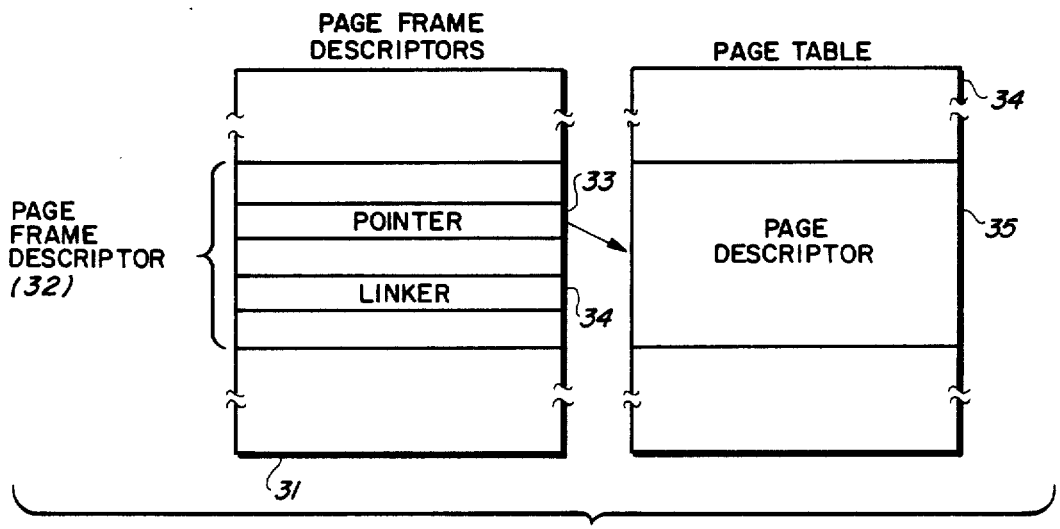
FIG. 3A is a diagram illustrating the relationship between the page frame descriptor table and the page table.
Figure 3B:
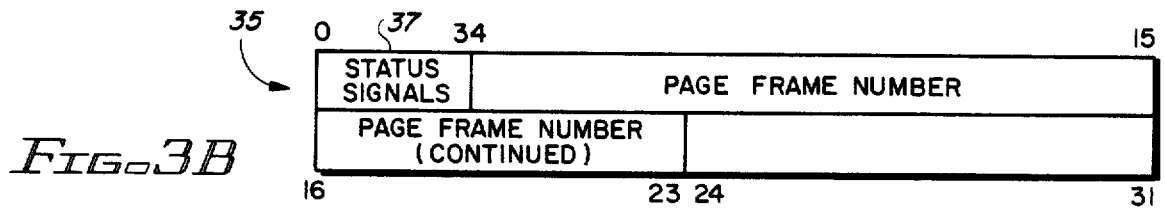
FIG. 3B illustrates the allocation of the bit positions in the page descriptor and FIG. 3C illustrates the identification of the status signals in the page descriptor.
Figure 3C:
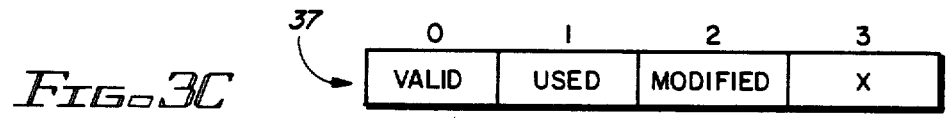

Referring next to FIG. 3A, 3B and 3C, an organization of tables of particular importance to the present invention is shown. In FIG. 3A, a table of page frame descriptors 31 is established during initialization of the data processing system. Each page frame descriptor is associated with one of the page frames 22 through 23 of FIG. 2. The purpose of the page frame descriptor, as it relates to the present invention, is to identify the physical address of the data currently stored in the associated page frame. This task is accomplished by providing a pointer to the page table 34 and, more particularly, to the page descriptor 35 associated with the data currently stored in the page frame. The page frame descriptor 32 also includes a group of locations which define the order of the page frame relative to the other page frames. When the data in a page frame is replaced, the linker, implementing the ordering of the page frames, insures that all the other page frames in the main memory unit will be reviewed for replacement of data before the page frame with the just replaced data is again reviewed. FIG. 3B illustrates the structure of the page descriptor 35 shown in FIG. 3A. The page descriptor includes status signals 37 in the bit positions 0-3 and a page frame number identifying the page frame in bit positions 4-23. FIG. 3C provides an identification of the status bits in the preferred embodiment. the first position is the valid bit and indicates when the data page is in a page frame in the main memory unit and is valid. The second position is the use bit and is set each time the data in the associated page frame is accessed. Position 3 is the modified bit and indicates that there is a difference between the data in the page frame and the data from which the page frame was extracted. The status bit in the fourth position is currently reserved for future interpretation.

Figure 4:
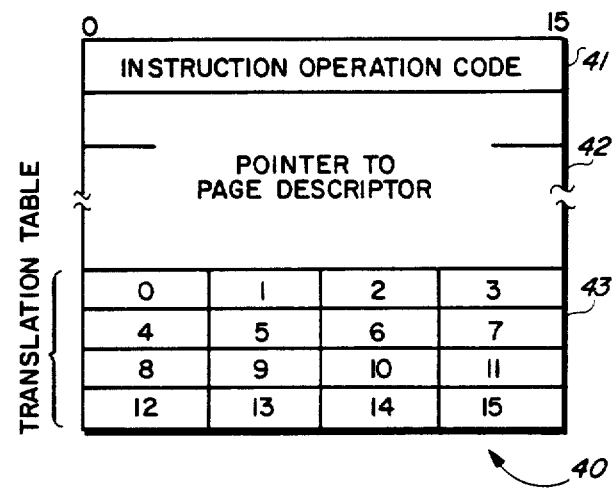
FIG. 4 is a diagram of the bit positions of the replacement instruction.

Referring next to FIG. 4, the structure of the instruction executing the replacement algorithm is shown. The first 16 bit positions identify the operation code of the instruction. The second 16 bits and possibly additional 16 bit data signal groups provide a pointer to the page descriptor. In the final four groups of 16 bits is contained the translation table.

Referring to FIG. 5A, the translation table entries, according to the preferred embodiment, are shown. The table entries are indicated in hexadecimal notation. The actual translation is illustrated in FIG. 5B showing how the status signals of the page descriptor are modified by the replacement algorithm.

Referring next to FIG. 6, the apparatus implementing the instruction is illustrated. In the execution unit of a processor, the instruction register 61 is loaded with data signals determined by the operation code of the instruction. The signals from the instruction register are applied to the decode and control apparatus 62. The decode and control apparatus 62 applies signals to addressing apparatus 63. Under the control of the decode and control apparatus 62, the status signals from the retrieved page descriptor which are stored in register 64 of the working registers 60 are used as the address signals to address an entry in the translation table associated with the instruction. The entry addressed by the status signals via the addressing apparatus 63 provide the new status signals to be stored in the page descriptor. The signal analysis unit 66 is used to indicate that a replacement page frame has been identified and to begin the procedure to store the desired information page in the page frame.

Figure 7:
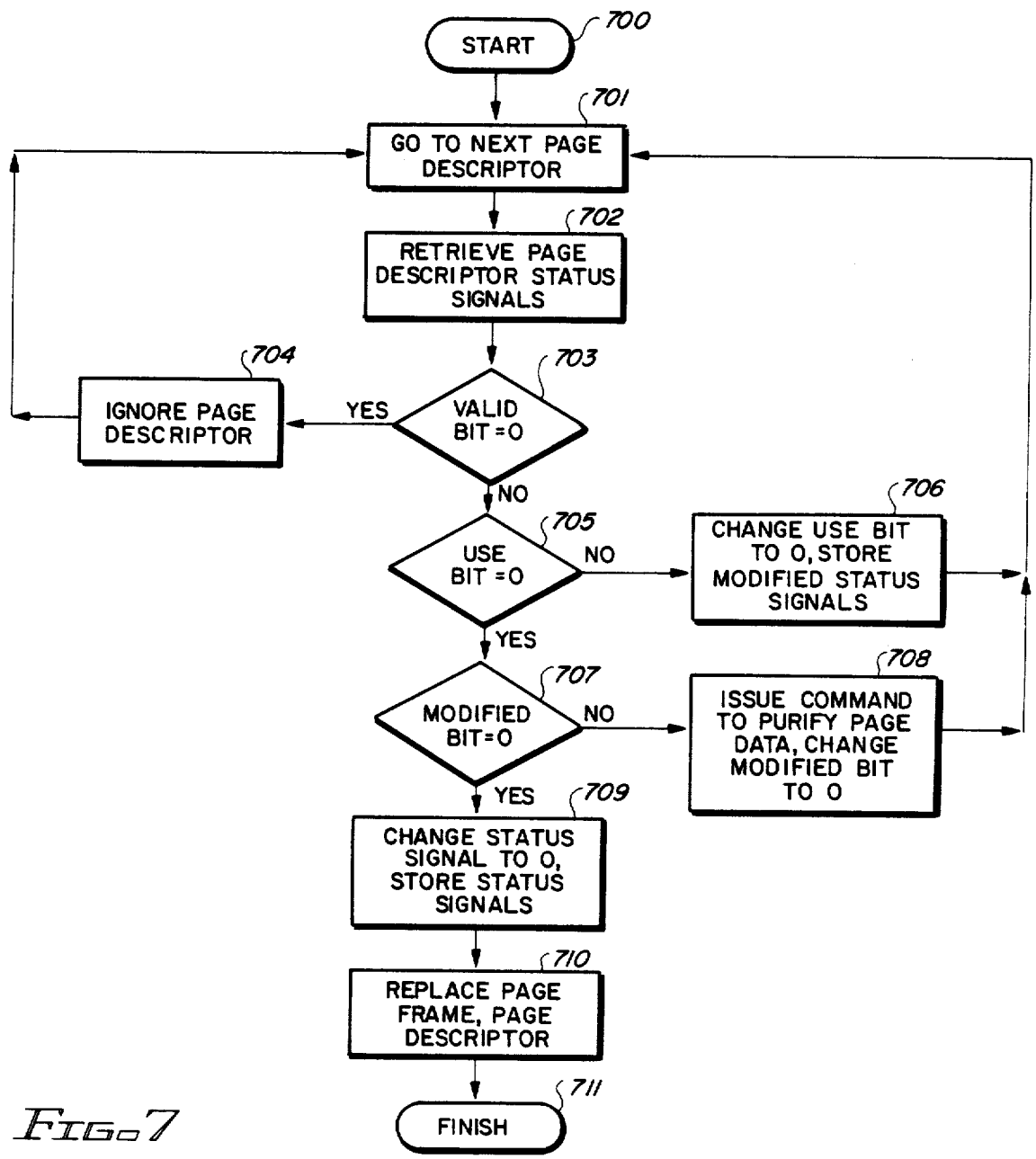
FIG. 7 is a flow diagram illustrating how the replacement instruction can be implemented by a software procedure.

Referring next to FIG. 7, the flow chart for examining page descriptors to determine if the associated page frame should be replaced is shown. After beginning the process in step 700, for example by executing the instruction illustrated in FIG. 4, the next page descriptor is selected. This selection is determined by the linker memory locations 34 illustrated in FIG. 3A. The linker, in the preferred embodiment, selects a page descriptor that has remained unexamined by the replacement algorithm. Upon selection of the page descriptor to be examined, the status signals forming a portion of the page descriptor are retrieved from main memory in step 702. In step 703 the valid status signal is examined. If the valid signal is a logic "0" signal, the page descriptor is not changed in step 704 and the procedure returns to step 701 to select a next page descriptor. When the valid signal is a logic "1" signal, the use signal is examined in step 705. When the use signal is a logic "1" signal, the use bit position is changed to a logic "0" signal and the new status signals are stored in the appropriate page descriptor positions in main memory in step 706. The procedure then returns to step 701 to select a next descriptor for examination. When the use signal is a logic "0" signal, then the modified status signal is examined in step 707. When the modified status signal is a logic "1" signal, then the modified bit is changed to a logic "0" signal while a command is issued to bring the data in the page frame in correspondence with (or purify) the data from which the page frame data was derived in step 708. When the modified status signal is a logic "0" signal, then the associated page frame is one suitable for replacement. Step 709 changes the status signals to all logic "0" signals and stores these logic signals in appropriate positions in the page descriptor. The page descriptor is invalidated and the data in the page frame is replaced with the requested data page. The page descriptor is modified to represent the new data stored in the page frame via step 710. The page descriptor is replaced in the sequence of page frames via the linker in the page frame descriptor and the process of replacing data in a page frame has been completed, i.e. step 711.

Referring next to FIG. 8, in the preferred embodiment, the main memory unit is controlled by two controllers, A and B. Each memory controller controls one half of the memory locations. In each controller, the associated memory locations are divided into a plurality of sectors 83. Access to each sector can be controlled by the associated memory controller. Therefore, when, for example, a memory location is in the process of being altered, the controller can prevent acess to the particular sector without limiting access to the entire region associated with the memory controller. Because of the expense and complexity, the access control to individual memory locations is seldom implemented. For this reason, the limiting of access to a particular memory location results in the limiting of access to a multiplicity of memory locations and any lengthy limitation of access can potentially impact the performance of the data processing system.

2. Operation of the Preferred Embodiment

The present invention resolves the problem of the access to the main memory unit by processors during a possible change in the location contents by providing a efficient determination of the page replacement algorithm. In this manner, the portion of the main memory that is reserved during the execution of the algorithm is reserved for only a short period of time, thereby minimizing the impact on the performance of the data processing system. In place of a software procedure that can limit access to sections of the main memory for an unacceptable period of time, the determination of the suitability of a page frame for replacement is determined by an instruction in which the status signals associated with the page frame are used as address signals to determine an entry of a table. The table is associated with the instruction itself. The entires in the instruction can be determined in a relatively short period of time. These new or resulting status signals can be immediately stored in the descriptor. Because the new status signals prohibit use of the associated page frame, the memory mechanism limiting access to the main memory unit sector including the page descriptor can be removed. The relatively short time required for this procedure minimizes impact on the main memory unit accessibility and consequently on the data processing system performance.

An important feature of the implementation of an algorithm in a software procedure is the flexibility of the procedure. If, for example a different interpretation of a status signal is desired, the consequences of this change in interpretation can be provided by associated changes in the steps of the procedure. It will be clear that this flexibility is retained in the present invention by the location in the instruction to which the group of status signals is directed. By changing resultant signals, the flexibility can be maintained.

The foregoing description is included to illustrate the operation of the preferred embodiment and is not intended to limit the scope of the invention. The scope of the invention is to be limited only by the following claims. From the foregoing discussion, many variations will be apparent to those skilled in the art that would yet be encompassed by the spirit and scope of the invention.

What is claimed is:

1. In a data processing system in which each of a plurality of memory locations has a plurality of status signals associated therewith, apparatus for determining new status signals resulting from applying replacement algorithm to said status signals, said apparatus comprising:
   an instruction for implementing said algorithm, said instruction including a new status signal table therein;
   a first storage unit for storing said status signals in response to said instruction;
   a second storage unit for storing said new status signal table in response to said instruction; and
   addressing appratus coupled to said first and said second storage means and responsive to said instruction, said addressing apparatus applying said stored status signals to said second storage unit to address an entry in said new status signal table, a relationship between said entry addressed by said stored status signals and said stored status signals implementing said algorithm.

2. The apparatus for determining new status signals of claim 1 wherein said status signals are associated with a page frame of data, said replacement algorithm identifying when a page frame of data can be replaced with a new page frame of data.

3. The apparatus for determining new status signals of claim 2 wherein selected new status signal addressed by stored status signals causes said data processing system to replace said page frame of data associated with said stored status signals with a new page frame of data.

4. The apparatus for determining new status signals of claim 2 wherein a first of said status signals is related to usage of said associated page frame of data and a second of said status signals relates to modification of said associated page frame of data.

5. In a data processing system, a method of determining when to replace a page frame in a main memory of said data processing system, said method comprising the steps of:
   retrieving a first instruction from main memory to perform said replacement determination, said first instruction having associated therewith groups of status signals, at least one selected status signal group identifying conditions for replacement of an associated page frame;
   storing said first instruction status signal groups in a table;
   retrieving a page descriptor associated with said page frame;
   using a status signal group associated with said descriptor to access an entry in said instruction status signal group table; and
   determining when said entry is a selected status signal group.

6. The method of determining when to replace a page frame of claim 5 further comprising the step of replacing said status signal group with said instruction table entry in said associated descriptor when said entry is not a selected status signal group.

7. The method of determining when to replace a page frame of claim 5 further comprising the steps of:
   placing a plurality of page frames in a sequential order; and
   retrieving a descriptor associated with a next sequential page frame when a status signal group of said retrieved descriptor does not access a selected status signal group.

8. The method of determining when to replace a page frame of claim 5 further including the step of associating said status signals with usage, validity and modification attributes of said page frame.

9. In a data processing system having page frames storing data in a main memory unit, apparatus in a processor for determining when a page frame of data can be replaced, said apparatus comprising:
   retrieval apparatus associated with said processor for retrieving an instruction, said instruction including a plurality of entries from said main memory unit, wherein said plurality of entries is stored in said processor, said retrieval apparatus responsive to said instruction for retrieving at least a preselected field of a descriptor associated with said page frame, wherein said preselected field of said descriptor is stored in said processor;
   addressing apparatus responsive to said preselected field for forming an address field, said addressing apparatus being said address field to address a predetermined one of entries, said predetermined entry being a replacement preselected field for said descriptor; and
   decision apparatus responsive to said replacement preselected field for providing a signal to said processor indicating when a page frame of data can be replaced.

10. The frame page replacement apparatus of claim 9 further including apparatus for replacing said preselected field with said replacement preselected field in said descriptor in said main memory unit.

11. The page frame replacement apparatus of claim 9 wherein said page frames have a sequential order, said retrieving apparatus retrieving at least a preselected field of a next sequential descriptor when said decision apparatus indicates that said page frame can not be replaced.

12. The page frame replacement apparatus of claim 11 wherein said next sequential descriptor is a descriptor that has not had said preselected field replaced for the longest interval.

13. The page frame replacement apparatus of claim 9 wherein said preselected field includes a plurality of status signals, a one of said status signals signifying use of data in said page frame.

14. The page frame replacement apparatus of claim 10 wherein a portion of said main memory unit storing said descriptor is unavailable to a remainder of said data processing system during execution of said instruction.

15. In a data processing system, an instruction executed without intervention of a software procedure for causing a processor to determine when a selected page frame stored in a main memory unit can be replaced, said instruction comprising:
   a first field having an operation code;
   a second field, said first field causing said processor to retrieve and to store therein at least a predetermined field of a descriptor stored in said main memory unit and associated with said selected page frame, a location of said descriptor being identified by said second field; and
   a third field including a plurality of entries, said third field being stored in said processor, said first field causing said processor to select a one of said instruction entries in response to said predetermined field, said selected entry determining when said selected page frame is to be replaced.

16. The instruction for determining when a selected page frame can be replaced of claim 15 wherein said selected entry is a replacement field for said predetermined descriptor field, said replacement field being stored in said predetermined field with said descriptor in said main memory unit.

17. The instruction for determining when a selected page frame can be replaced of claim 15 wherein said predetermined descriptor field includes a multiplicity of logic signals defining a status of said selected page frame.

18. The instruction for determining when a selected page frame can be replaced of claim 17 wherein said status signals are indicative of a validity of data in said selected page frame, are indicative of use of said selected page frame and are indicative of modification of said selected page frame.

19. The instruction for determining when a selected page frame can be replaced of claim 15 wherein said instruction entries are stored in a processor memory unit, said first field causing said processor to select an address in said processor memory unit determined by logic signals in said predetermined descriptor field.

* * * * *

UNITED STATES PATENT AND TRADEMARK OFFICE
CERTIFICATE OF CORRECTION

PATENT NO. : 4,833,603
DATED : May 23, 1989
INVENTOR(S) : Victor M. Morganti and James B. Geyer It is certified that error appears in the above-identified patent and that said Letters Patent are hereby corrected as shown below:

On the Title Page:

The Filing Date is corrected to read --May 30, 1986-- in lieu of "May 30, 1966."

Signed and Sealed this

Thirteenth Day of February, 1990

Attest:

JEFFREY M. SAMUELS

*Attesting Officer*      *Acting Commissioner of Patents and Trademarks*